(No Model.) 2 Sheets—Sheet 1.

J. F. MUNSIE.
ELECTRIC RAILWAY.

No. 455,233. Patented June 30, 1891.

Attest:
F. H. Schott
A. M. Parkins

Inventor:
James F. Munsie,
by Munsie & Goldsborough,
Attys.

(No Model.) 2 Sheets—Sheet 2.
J. F. MUNSIE.
ELECTRIC RAILWAY.
No. 455,233. Patented June 30, 1891.
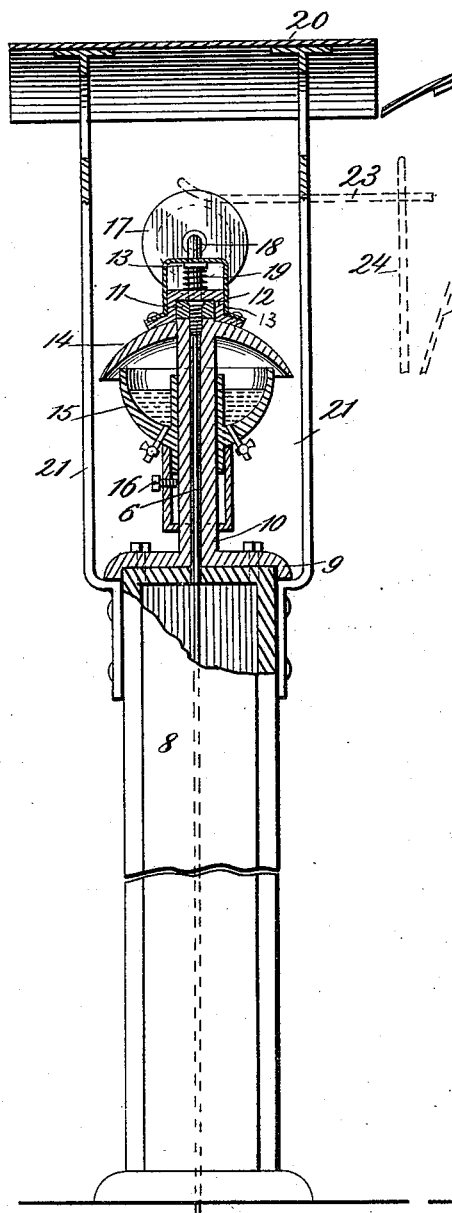
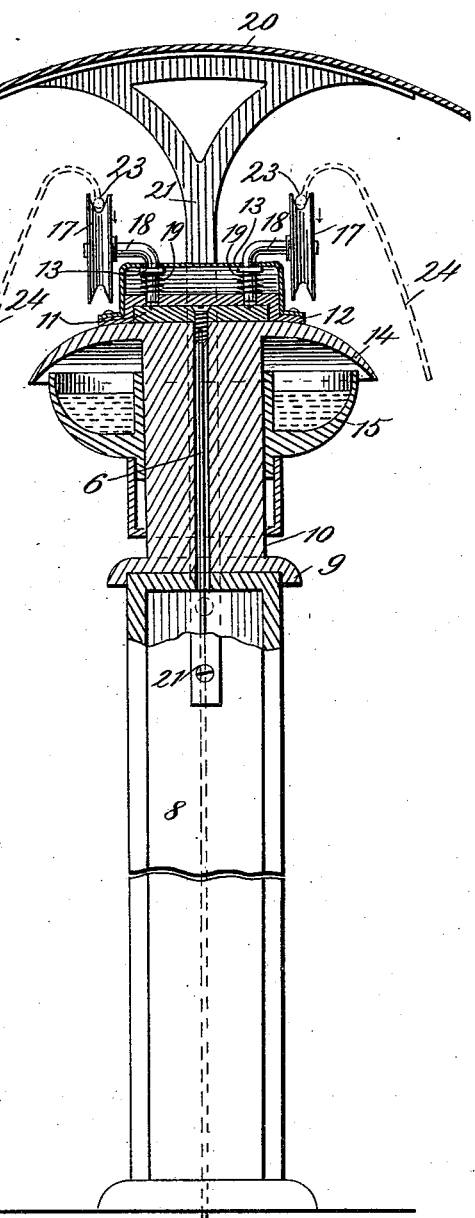
Attest:
F. H. Schott
A. M. Parkins
Inventor
James F. Munsie
by Pennie & Goldsborough
Attys

UNITED STATES PATENT OFFICE.

JAMES F. MUNSIE, OF BROOKLYN, NEW YORK.

ELECTRIC RAILWAY.

SPECIFICATION forming part of Letters Patent No. 455,233, dated June 30, 1891.

Application filed May 8, 1891. Serial No. 392,102. (No model.)

*To all whom it may concern:*

Be it known that I, JAMES F. MUNSIE, a subject of the Queen of England, residing at Brooklyn, in the county of Kings and State of New York, have invented certain new and useful Improvements in Electric Railways; and I do hereby declare the following to be a full, clear, and exact description of the invention, such as will enable others skilled in the art to which it appertains to make and use the same.

My invention relates to certain new and useful improvements in and appertaining to electric railways, and has for its object to dispense entirely with the permanent trolley-tracks ordinarily employed for overhead electric railways, thereby obviating the disadvantages attendant upon the obstruction of the streets and the dangers to life and property incident to such permanent trackways.

Figure 1:
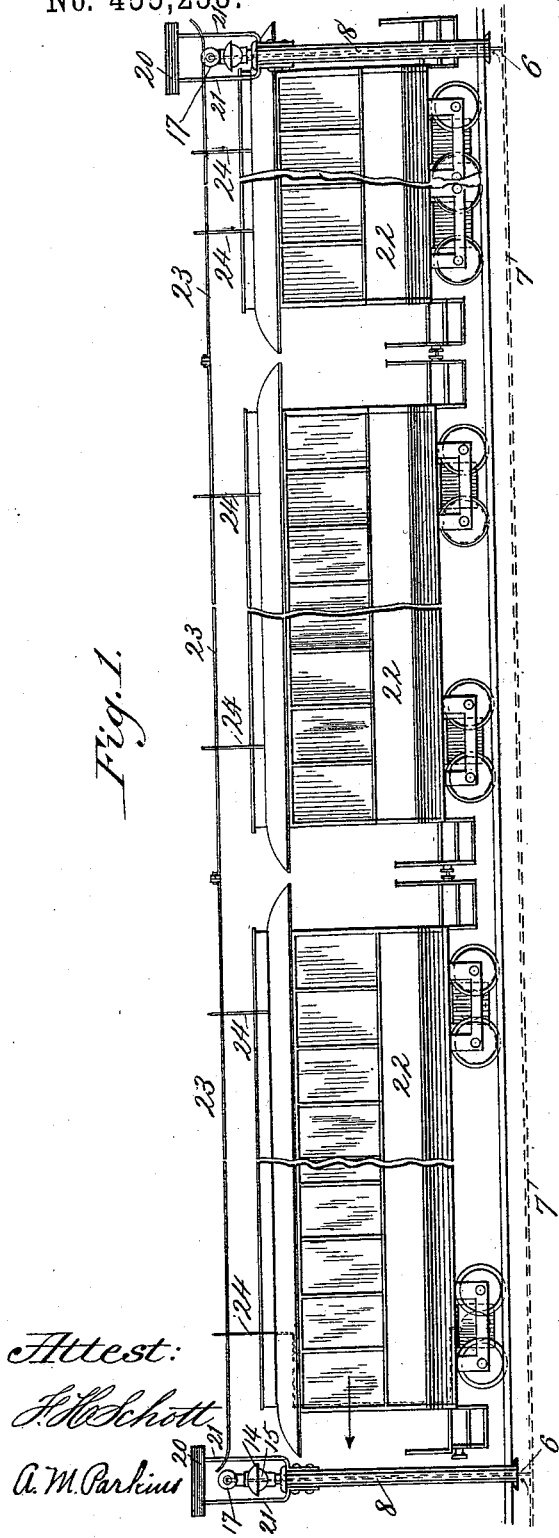
Figure 2:
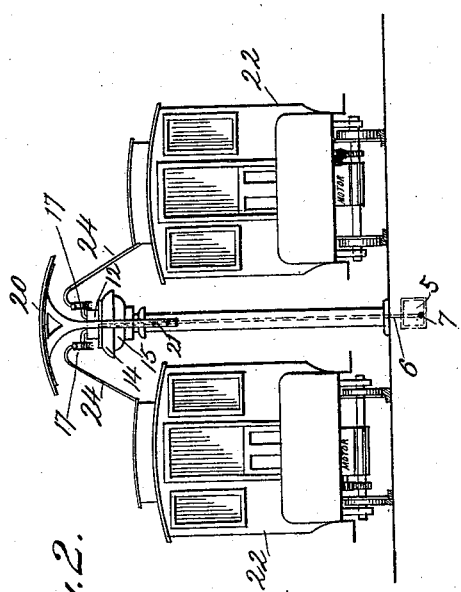

In the accompanying drawings, illustrative of my improvements, Figure 1 represents a side view of a portion of an electric railway embodying my invention in connection with a train of electrically-propelled cars operated in accordance therewith. Fig. 2 represents a sectional view and end elevation of a double-track electric railway embodying the invention. Fig. 3 represents a side elevation and partial section, on a larger scale, of one of the contact posts or standards and its appurtenances; and Fig. 4 represents a like view on a plane at right angles to that of Fig. 3.

Similar numerals of reference indicate similar parts throughout the several views.

Referring to the drawings, 5 indicates an underground conduit for the reception of the positive conductor leading from the dynamo-electric machine or other electrical generator of the supply-station. Said underground conduit may be conveniently located between two contiguous tracks, as shown in Fig. 2, and from point to point along the tracks. Branch conductors or leads, as 6, may extend upwardly from the main conductor 7, just referred to, said branch conductors passing through the hollow interior of corresponding posts or standards 8, erected between the trackways at suitable distances apart from one end of the railway to the other.

Upon the top of each of the hollow posts or standards 8 is secured the base 9 of an insulator, said insulator being formed of non-conducting material, preferably glass or vulcanite. The stem 10 of the insulator is hollowed out for the passage of the branch conductor 6, which conductor makes electrical contact with a contact-plate 11, resting upon the top of the insulator. The contact-plate 11 is held in place by a cap-piece 12, of non-conducting material, said cap-piece being provided with edge flanges for supporting a covering-plate 13, having similar flanges, and the two flanges being secured to the cap-piece 14 of the insulator. The cap-piece 14 is rounded off upon its upper surface and projects over the cup 15, said cup being adapted to receive a filling of sulphuric acid or other hygroscopic material, and being adapted to be adjusted up and down upon the stem 10 by means of the binding-screw 16. It will be noted that a free annular space is left between the cap 14 of the insulator and the upper edge of the subjacent cup 15. Owing to this fact and also to the moisture-absorbing properties of the hygroscopic material the under surface of the cap-piece 14 is kept constantly dry, so as to obviate the liability of grounding the current in wet weather. The details of construction of this insulator, however, form the subject-matter of other applications for patent filed by me, and are not claimed herein.

Grooved rollers 17, having bent gudgeons 18, are mounted above the insulator, the said rollers and gudgeons being formed of metal and being normally held out of contact with the contact-plate 11 by means of the springs 19, but being adapted to form good contact therewith when depressed in opposition to the springs. The insulators and their rollers are protected by means of a hood 20, having arms 21 bolted to the post or standard.

In Figs. 1 and 2 I have indicated the manner of utilizing the invention for the propulsion of electrically-operated cars. These cars, as 22, may conveniently be connected by draw-bars or couplers of any suitable character to form a train or (if of sufficient length with respect to the distance between adjacent standards) may be used singly. If made up in the form of a train, each car may have its own electric motor suitably geared to the traction-wheel axles, or any one or more of the cars may be provided with such motor and the remaining car or cars in such event be drawn by the motor-car. If a single car only is used instead of a train, it must of course be provided with an electric motor. The leading-in wire of the electric motor or motors of the car or cars is electrically connected to a contact-bar 23, (made up in sections electrically connected where two or more cars are used,) said contact-bar being suspended from the roof of the car or cars by means of spring-arms 24, which may themselves constitute the electrical connection to the leading-in wire or wires. It will be noted that the end of the contact-bar is curved or bent upwardly and that the bar itself projects outwardly from the car to a sufficient distance to range itself in line with the series of grooved rollers 17.

It will of course be understood that the outgoing wires of the electric motors are suitably grounded, so that said motors when in circuit with the positive conductor through the instrumentality of any of the contact-rollers 17 and the contact-bar 23 and leading-in wire will be operated by the current to drive the car.

The operation of the invention will be readily understood. When the upturned end of the contact-bar 23 in the forward movement of the car enters the groove or tread of the roller 17 in advance of it, the said upturned end depresses the roller against the upward tendency of the spring 19, thereby bringing the bent gudgeon 18 in contact with the contact-plate 11. Electrical connection is thereby established from the underground positive conductor through the electric motor, the current passing upwardly from the corresponding branch conductor to the contact-plate 11 and through the gudgeon 18, roller 17, contact-bar 23, spring arm or arms 24, and leading-in wires through the motor to the ground. The motor or motors will consequently propel the car or cars forward, the contact-bar 23 running in the roller-groove and maintaining contact between the bent gudgeons 18 and contact-plate 11. When the rear end of the contact-bar is about to leave the roller upon which the contact-bar has been running, the forward end of the bar enters the groove of the roller next in advance and establishes electrical connection with the positive conductor of the underground conduit by means of said roller and its contact-plate before the circuit is broken at the first roller. The supply of current to the electric motors is therefore continuous during the car's travel, the rate of speed of the motor being determined in any usual manner—as, for instance, by throwing in or out resistances in the motor-circuit—and the car being stopped when desired by breaking said circuit by means of a switch or the like on the car itself. These appliances being well understood in the art, it is not necessary to describe or show them in detail.

It is characteristic of my invention that the space between the standards or poles is entirely free of any permanent trolley-wire or similar projection, and that the rollers 17 are normally out of contact with the underground conductor. This construction and arrangement gives the double advantage of leaving the streets entirely unobstructed by permanent wires, and also guards against the danger to life and property that would be attendant upon having the rollers in permanent electrical connection with the said underground conductor.

It will of course be evident that by reversing the motor-car the train may be propelled in the opposite direction. For this purpose both ends of the contact-bar 23 are provided with an upward curve.

What I claim is—

1. An electric railway comprising an underground feeding-conductor, a series of branch conductors extending therefrom and separated by intervening spaces, overhead contacts normally out of electrical connection with said branch conductors, and a bar mounted upon the car and in the motor-circuit of the car, said bar being adapted to bring said contacts successively into electrical connection with the branch conductors, substantially as described.

2. An electric railway comprising an underground feeding-conductor, a series of branch conductors extending therefrom and separated by intervening spaces, overhead contacts normally out of electrical connection with said branch conductors, and a bar mounted upon the car and in the motor-circuit of the car, said bar being adapted to bring said contacts successively into electrical connection with the branch conductors and being of a length greater than the distance between adjacent contacts, substantially as described.

3. An electric railway comprising a conduit, a feeding-conductor located within said conduit, a series of posts located at distances apart from each other along the line, branch conductors located within said posts, contacts mounted upon the posts and normally out of electrical connection with the branch conductors, and means, substantially as described, mounted upon the car for bringing said contacts successively into electrical connection with the branch conductors, substantially as described.

4. An electric railway comprising a conduit, a feeding-conductor located within said conduit, a series of posts located at distances apart from each other along the line, branch conductors located within said posts, terminal plates for said branch conductors, insulators upon which said terminal plates are mounted, contact-rollers normally out of electrical connection with said terminal plates, and means, substantially as described, mounted upon the car for bringing said contact-rollers successively into electrical connection with said terminal plates, substantially as described.

In testimony whereof I affix my signature in presence of two witnesses.

JAMES F. MUNSIE.

Witnesses:
    JOHN C. PENNIE,
    D. G. STUART.